United States Patent
Zhang

(10) Patent No.: US 10,560,749 B2
(45) Date of Patent: Feb. 11, 2020

(54) VIDEO PLAYING METHOD, VIDEO PLAYING DEVICE, VIDEO PLAYING SYSTEM, APPARATUS AND COMPUTER-READABLE STORAGE MEDIUM

(71) Applicant: BOE Technology Group Co., Ltd., Beijing (CN)

(72) Inventor: Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/046,130

(22) Filed: Jul. 26, 2018

(65) Prior Publication Data

US 2019/0174189 A1    Jun. 6, 2019

(30) Foreign Application Priority Data

Dec. 4, 2017    (CN) .......................... 2017 1 1260443

(51) Int. Cl.
| | |
|---|---|
| H04N 9/80 | (2006.01) |
| H04N 21/466 | (2011.01) |
| G06N 3/08 | (2006.01) |
| H04N 21/845 | (2011.01) |
| H04N 21/422 | (2011.01) |
| H04N 21/442 | (2011.01) |
| H04N 21/44 | (2011.01) |
| G11B 27/34 | (2006.01) |
| H04N 5/783 | (2006.01) |

(52) U.S. Cl.
CPC .......... *H04N 21/4666* (2013.01); *G06N 3/08* (2013.01); *G11B 27/34* (2013.01); *H04N 21/42201* (2013.01); *H04N 21/44008* (2013.01); *H04N 21/44218* (2013.01); *H04N 21/8456* (2013.01)

(58) Field of Classification Search
CPC .......... H04N 21/4666; H04N 21/8456; H04N 21/42201; H04N 21/44218; H04N 21/44008; G06N 3/08; G11B 27/34
USPC ....... 386/241, 278, 281, 290, 323, 343, 351, 386/262
See application file for complete search history.

(56) References Cited

U.S. PATENT DOCUMENTS

2016/0066036 A1* 3/2016 Felt .................... H04N 21/4542
                                                        386/241
2017/0289619 A1    10/2017 Xu et al.

FOREIGN PATENT DOCUMENTS

| CN | 102693739 A | 9/2012 |
|---|---|---|
| CN | 103826160 A | 5/2014 |

(Continued)

OTHER PUBLICATIONS

First Office Action, including Search Report, for Chinese Patent Application No. 201711260443.4, dated May 5, 2019, 13 pages.

*Primary Examiner* — Robert Chevalier
(74) *Attorney, Agent, or Firm* — Westman, Champlin & Koehler, P.A.

(57) ABSTRACT

A video playing method, a video playing device, a video playing system, an apparatus, and a computer-readable storage medium are provided. The video playing method includes dividing a video to be played into a plurality of video segments and labelling, respectively, the plurality of video segments with emotion categories of a user as labels according to a pre-stored correspondence between the emotion categories of the user and video contents, and determining whether each video segment is to be played according to the label of the video segment.

16 Claims, 4 Drawing Sheets

(56) References Cited

FOREIGN PATENT DOCUMENTS

| CN | 104410911 A | 3/2015 |
|---|---|---|
| CN | 105872763 A | 8/2016 |
| CN | 106792170 A | 5/2017 |
| CN | 106878809 A | 6/2017 |
| CN | 107145326 A | 9/2017 |
| CN | 107241622 A | 10/2017 |
| CN | 107257509 A | 10/2017 |
| CN | 107423727 A | 12/2017 |

* cited by examiner

VIDEO PLAYING METHOD, VIDEO PLAYING DEVICE, VIDEO PLAYING SYSTEM, APPARATUS AND COMPUTER-READABLE STORAGE MEDIUM

CROSS-REFERENCE TO RELATED APPLICATION

The present disclosure claims priority of the Chinese patent application No. 201711260443.4 filed on Dec. 4, 2017, entitled "VIDEO PLAYING METHOD, VIDEO PLAYING DEVICE AND VIDEO PLAYING SYSTEM", the entire contents of which are incorporated herein by reference.

TECHNICAL FIELD

The present disclosure relates to the field of display technology, and in particular relates to a video playing method, a video playing device, a video playing system, an apparatus, and a computer-readable storage medium.

BACKGROUND

A variety of video contents played on TV and web video players attract different groups of persons. A user may present different watching experiences at different time periods when watching a video as an emotion of the user may change at the different time periods due to different video contents. At present, a manner in which a video is to be played is usually selected by the user. However, in the case that the user does not know what content of the video to be played, the user may usually watch video segments which the user does not like or even hate. Thus, the user's watching experience is seriously affected.

SUMMARY

The present disclosure provides a video playing method, a video playing device, a video playing system, an apparatus, and a computer-readable storage medium, in which a video is played according to a user's preference.

The present disclosure provides a video playing method, including:

dividing a video to be played into a plurality of video segments and labelling, respectively, the plurality of video segments with emotion categories of a user as labels according to a pre-stored correspondence between the emotion categories of the user and video contents, and determining whether each video segment of the plurality of video segments is to be played according to the label of the video segment.

In some embodiments, the emotion categories of the user are determined based on a pre-generated first neural network, and the first neural network is configured to determine the emotion categories of the user based on physical parameters of the user.

In some embodiments, the correspondence between the emotion categories of the user and the video contents includes a second neural network, and the second neural network is generated by training with samples of the video contents and samples of the emotion categories of the user output from the first neural network.

In some embodiments, the physical parameters of the user include facial expression and physiological parameters of the user.

In some embodiments, the physiological parameters include at least one of heart rate, blood pressure, and blood oxygen.

In some embodiments, the video content includes one frame of image or a video segment including a plurality of frames of image.

In some embodiments, the video content includes one frame of image, and the step of dividing a video to be played into a plurality of video segments and labelling, respectively, the plurality of video segments with emotion categories of a user as labels according to a pre-stored correspondence between the emotion categories of the user and video contents, includes:

according to the pre-stored correspondence between the emotion categories of the user and the video contents, acquiring a plurality of frames of image in the video to be played;

as for each frame of image of the acquired plurality of frames of image, causing the frame of image together with a predetermined number of frames of image immediately before and after the frame of image to be divided into a same video segment; acquiring an emotion category of the user corresponding to the frame of image, and labelling the video segment to which the frame of image belongs with the emotion category of the user as a label, and the video segments have different durations and there is no overlap between every two video segments.

The present disclosure provides a video playing device including:

a video analysis portion configured to divide a video to be played into a plurality of video segments and label, respectively, the plurality of video segments with emotion categories of a user as labels to the plurality of video segments according to a pre-stored correspondence between the emotion categories of the user and video contents; and a video playing control portion configured to determine whether each video segment of the plurality of video segments is to be played according to the label of the video segment.

In some embodiments, the video playing device further includes a physical parameter acquisition portion and a first neural network generation and application portion, and the physical parameter acquisition portion is configured to acquire physical parameters of the user, and the first neural network generation and application portion is configured to generate a first neural network for representing a correspondence between physical parameters of the user and emotion categories of the user by using the acquired physical parameters of the user, and determine emotion categories of the user by using the generated first neural network.

In some embodiments, the correspondence between the emotion categories of the user and the video contents includes a second neural network, and the second neural network is generated by training with samples of the video contents and samples of the emotion categories of the user output from the first neural network.

In some embodiments, the physical parameter acquisition portion includes:

a face acquisition component configured to acquire facial expression of the user, and a physiological parameter acquisition component configured to acquire physiological parameters of the user.

In some embodiments, the physiological parameter acquisition component includes a smart wristband In some embodiments, the physiological parameters include at least one of heart rate, blood pressure, and blood oxygen.

In some embodiments, the video content is one frame of image or a video segment including a plurality of frames of image.

In some embodiments, the video content includes one frame of image, the video analysis portion is configured to, according to the pre-stored correspondence between the emotion categories of the user and the video contents, acquire a plurality of frames of image in the video to be played, and the video analysis portion is further configured to, as for each frame of image of the acquired plurality of frames of image, cause the frame of image together with a predetermined number of frames of image immediately before and after the frame of image to be divided into a same video segment, acquire an emotion category of the user corresponding to the frame of image, and label the video segment to which the frame of image belongs with the emotion category of the user as a label, and the video segments have different durations, and there is no overlap between every two video segments.

The present disclosure provides a video playing system including the aforementioned video playing device.

In some embodiments, the video playing device includes the first neural network for representing the correspondence between physical parameters of the user and emotion categories of the user; and the video playing system further includes a first offline training component configured to, in an offline state, generate the first neural network by using the physical parameters of the user.

In some embodiments, the correspondence between the emotion categories of the user and the video contents includes a second neural network; and the video playing system further includes a second offline training component configured to, in the offline state, generate a second neural network by training with samples of the video contents and samples of the emotion categories of the user output from the first neural network.

The present disclosure provides an apparatus including:
at least one processor, and
a memory for storing at least one program,
and the at least one program, when executed by the at least one processor, performs the aforementioned video playing method.

The present disclosure provides a computer-readable storage medium storing computer programs, wherein the aforementioned video playing method is implemented when the computer programs are executed by a processor

DETAILED DESCRIPTION

The present disclosure will be described in detail below in conjunction with the drawings and embodiments in order that a person skilled in the art can understand the technical solutions of the present disclosure better.

Figure 1:
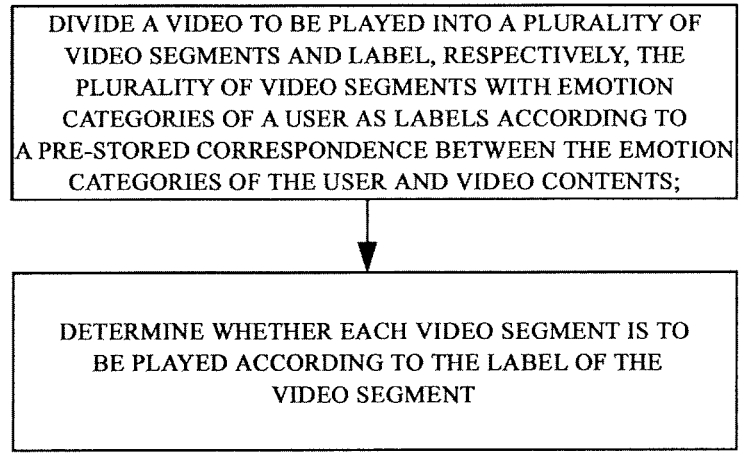
FIG. 1 shows a flowchart of a video playing method according to an embodiment of the present disclosure.

As shown in FIG. 1, the present disclosure provides a video playing method, including: dividing a video to be played into a plurality of video segments and labelling, respectively, the plurality of video segments with emotion categories of a user as labels according to a pre-stored correspondence between the emotion categories of the user and video contents, and determining whether each video segment is to be played according to the label of the video segment.

It should be noted that, the "video segment" in the present disclosure refers to a plurality of frames of image in a video which are continuous and meet certain requirements, and the "video content" in the present disclosure may be a video segment or one frame of image in a video.

In the video playing method of this embodiment, firstly a video to be played is divided into a plurality of video segments and correspondingly emotion categories of a user as labels are labeled to the plurality of video segments according to a pre-stored correspondence between the emotion categories of the user and video contents. Then whether each video segment is to be played is determined according to the label of the video segment, that is, the video segments in the video to be played are played selectively. For example, a video segment is played only in the case that the user's emotion category corresponding to the video segment is "like". Therefore, the purpose of improving user experience can be achieved.

For the sake of clarity, the video playing method in this embodiment will be specifically described in conjunction with the following embodiments.

Figure 2:
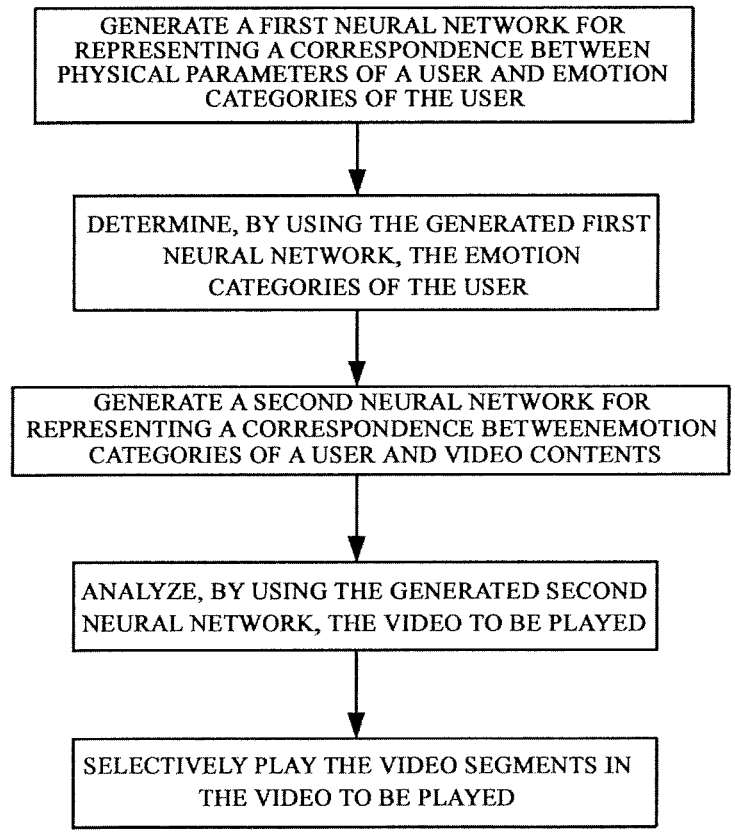
FIG. 2 shows a flowchart of a video playing method according to an embodiment of the present disclosure.

As shown in FIG. 2, the present disclosure provides a video playing method, including steps S1 to S5.

In step S1, a first neural network is generated for representing a correspondence between physical parameters of a user and emotion categories of the user.

Specifically, the first neural network may be generated by training with physical parameter samples of a user and universal emotion categories of a person, wherein the physical parameters of the user can be acquired by a physical parameter acquisition portion. For example, the user's facial expression can be acquired by a face acquisition component such as a camera, and the user's blood pressure, heart rate, blood oxygen, and the like can be acquired by a smart wristband. The universal emotion categories of a person may include five kinds, i.e., a first emotion category to a fifth emotion category, the first emotion category may be "hate" presented by a person, and the fifth emotion category may be "like" presented by a person. The second to fourth emotion categories are transitions between the above two.

It should be noted that, the first neural network is just an example of the correspondence between physical parameters of a user and emotion categories of the user. This correspondence between physical parameters of a user and emotion categories of the user may also be established by using any other suitable form such as a mapping table.

In step S2, emotion categories of the user are determined by using the generated first neural network.

In step S3, a second neural network is generated for representing a correspondence between emotion categories of a user and video contents.

Specifically, the second neural network may be generated by training with video content samples and emotion category samples of a user output from the first neural network.

The generation of the second neural network is illustrated below.

Firstly, a video content sample of a certain video watched by a user is acquired, and a physical parameter of the user when the user watches this video content sample is acquired, and the physical parameter is input to the first neural network, and thus an emotion category of the user when watching the video content sample is acquired. In this case, this emotion category is an emotion category sample of the user corresponding to the video content sample. In accordance with this method, a plurality of video content samples and a plurality of emotion category samples of the user corresponding thereto are acquired.

Subsequently, the second neural network is generated by training with the video content samples and emotion category samples of the user corresponding thereto.

It should be noted that, the second neural network is just an example of the correspondence between emotion categories of a user and video contents. This correspondence between emotion categories of a user and video contents may also be established by using any other suitable form such as a mapping table.

In step S4, the video to be played is analyzed by using the generated second neural network.

Specifically, firstly, a user's identity is identified. Subsequently, a second neural network corresponding to the user is acquired. Finally, by using the acquired second neural network, the video to be played is divided into a plurality of video segments and correspondingly emotion categories of the user as labels are labeled to the plurality of video segments.

In this case, the video content may be one frame of image or a video segment. In the case that the video content is one frame of image, the above step of diving the video to be played into a plurality of video segments with the acquired second neural network, and correspondingly labelling the plurality of video segments with emotion categories of the user as labels may include the following steps.

With the second neural network, a plurality of frames of image in the video to be played are acquired, and each frame of image of the acquired plurality of frames of image together with a predetermined number of frames of image immediately before and after the frame of image are divided into a same video segment. Then an emotion category of a user corresponding to the frame of image is acquired, and the emotion category of the user as a label is labeled to the video segment to which the frame of image belongs. The video segments may have an identical duration or different durations, and there is no overlap between every two video segments. Please note that all the divided video segments may be integrated into the whole video to be displayed.

In step S5, the video segments in the video to be played are played selectively.

Whether each video segment in the video to be played is to be played is determined according to the label of the video segment.

Specifically, a video segment is retained in the case that the label of the video segment represents that the user likes this video segment, that is, the emotion category of the user corresponding to the video segment is "like". A video segment is removed in the case that the label of the video segment represents that the user hates this video segment, that is, the emotion category of the user corresponding to the video segment is "hate".

It should be noted that, the above step S1 and step S3 may not be included in the video playing method of this embodiment. That is, the first neural network and the second neural network may be generated by offline training in advance.

In the video playing method of this embodiment, firstly emotion categories of a user are determined by using a first neural network corresponding to the user. Subsequently, a video to be played is divided into a plurality of video segments and correspondingly emotion categories of the user as labels are labeled to the plurality of video segments by using a second neural network corresponding to the user. Then whether each video segment is to be played is determined according to the label of the video segment, that is, the video segments in the video to be played are played selectively. For example, a video segment is played only in the case that the user's emotion category corresponding to the video segment is "like". Therefore, the purpose of improving user experience can be achieved.

Figure 3:
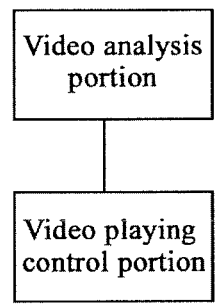
FIG. 3 shows a schematic diagram of a video playing device according to an embodiment of the present disclosure.

As shown in FIG. 3, the present disclosure provides a video playing device including a video analysis portion and a video playing control portion. The video analysis portion is configured to divide a video to be played into a plurality of video segments and correspondingly label emotion categories of a user as labels to the plurality of video segments according to a pre-stored correspondence between the emotion categories of the user and video contents. The video playing control portion is configured to determine whether each video segment is to be played according to the label of the video segment.

The video analysis portion in the video playing device of this embodiment divides a video to be played into a plurality of video segments and correspondingly labels emotion categories of a user as labels to the plurality of video segments according to a pre-stored correspondence between the emotion categories of the user and video contents. Thus, the video playing control portion may determine whether each video segment is to be played according to the label of the video segment, that is, the video playing device in this embodiment can selectively play the video segments in the video to be played. For example, a video segment is to be played only in the case that the user's emotion category corresponding to the video segment is "like". Therefore, the purpose of improving user experience can be achieved.

Figure 4:
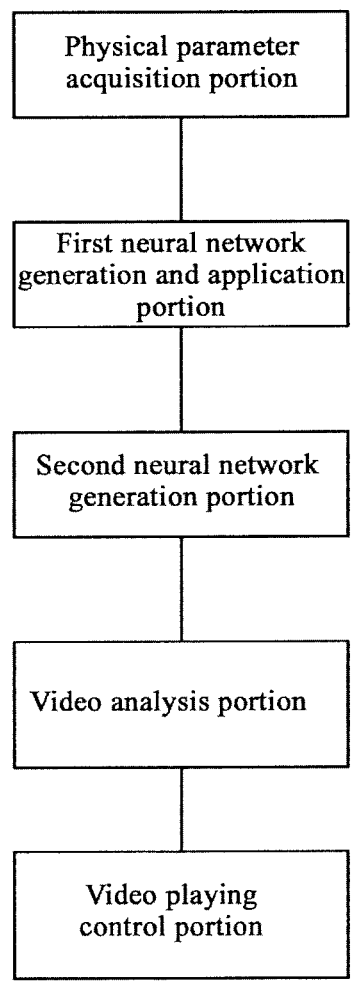
FIG. 4 shows a schematic diagram of a video playing device according to an embodiment of the present disclosure.

As shown in FIG. 4, the present disclosure provides a video playing device, including: a physical parameter acquisition portion, a first neural network generation and application portion, a second neural network generation portion, a video analysis portion, and a video playing control portion. The physical parameter acquisition portion is configured to acquire physical parameters of a user. The first neural network generation and application portion is configured to generate a first neural network for representing a correspondence between physical parameters of the user and emotion categories of the user by training with acquired physical parameter samples of the user and human universal emotion categories, and determine emotion categories of the user by using the generated first neural network. The second neural network generation portion is configured to generate a second neural network for representing a correspondence between emotion categories of a user and video contents by training with video content samples and emotion category samples of a user output from the first neural network. The video analysis portion is configured to divide a video to be played into a plurality of video segments and correspondingly label emotion categories of a user as labels to the plurality of video segments by using the second neural network. The video playing control portion is configured to determine whether each video segment is to be played according to the label of the video segment.

The video analysis portion in the video playing device of this embodiment divides a video to be played into a plurality of video segments and correspondingly labels emotion categories of a user as labels to the plurality of video segments by using the generated first and second neural network. Thus, the video playing control portion may determine whether each video segment is to be played according to the label of the video segment, that is, the video playing device in this embodiment can selectively play the video segments in the video to be played. For example, a video segment is played only in the case that the user's emotion category corresponding to the video segment is "like". Therefore, the purpose of improving user experience can be achieved.

Figure 5:
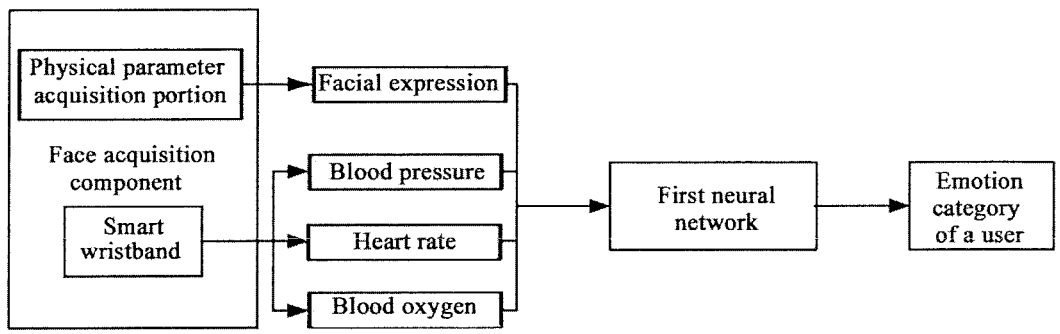
FIG. 5 shows a schematic diagram of a workflow of a first neural network according to an embodiment of the present disclosure.

FIG. 5 shows a schematic diagram of a workflow of a first neural network according to the present disclosure. Specifically, the physical parameter acquisition portion sends the acquired physical parameters of a user to the first neural network. The first neural network derives an emotion category of the user from the received physical parameters of the user. The physical parameter acquisition portion includes a face acquisition component and a physiological parameter acquisition component, and the face acquisition component is configured to acquire the user's facial expression and the physiological parameter acquisition component is configured to acquire the user's physiological parameters which include at least one of heart rate, blood pressure, and blood oxygen. The physiological parameter acquisition component includes a smart wristband.

Since the user's facial expression and physiological parameters including at least one of heart rate, blood pressure, and blood oxygen are used as physical parameters of the user in the present disclosure, the user's emotion category may be analyzed more accurately with the first neural network.

Figure 6:
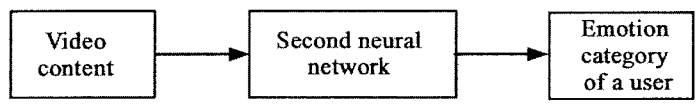
FIG. 6 shows a schematic diagram of a workflow of a second neural network according to an embodiment of the present disclosure.

FIG. 6 shows a schematic diagram of a workflow of a second neural network according to the present disclosure. When the second neural network receives a video content, an emotion category of a user is generated according to the correspondence between emotion categories of the user and video contents contained in the second neural network. The second neural network is generated by training with video content samples and emotion category samples of a user output from the first neural network.

An example of the generation of the second neural network is illustrated below. Firstly, a video content sample of a certain video watched by a user is acquired, a physical parameter of the user when the user watch this video content sample is acquired, and the physical parameter is input to the first neural network, and thus an emotion category of the user when watching the video content sample is acquired. In this case, this emotion category is an emotion category sample of the user corresponding to the video content sample. In accordance with this method, a plurality of video content samples and a plurality of emotion category samples of the user corresponding thereto are acquired. Subsequently, the second neural network is generated by training with the video content samples and emotion category samples of the user corresponding thereto.

In the video playing device of the present disclosure, the video content may be one frame of image or a video segment. In the case that the video content is one frame of image, the video analysis portion is configured to, according to a pre-stored correspondence between the emotion categories of a user and video contents or the second neural network, acquire a plurality of frames of image in the video to be played, for each frame of image of the acquired plurality of frames of image cause the frame of image together with a predetermined number of frames of image immediately before and after this frame of image to be divided into a same video segment, acquire an emotion category of the user corresponding to the frame of image, and label the emotion category of the user as a label to the video segment to which the frame of image belongs. The video segments may have an identical duration or different durations, and there is no overlap between every two video segments and all the divided video segments may be integrated into the whole video to be displayed.

It should be noted that, in the case that the video content is a video segment, the divided video segments may have an identical duration or different durations. In addition, the video may be divided very fast according to the pre-stored correspondence between the emotion categories of a user and video contents or the second neural network.

Figure 7:
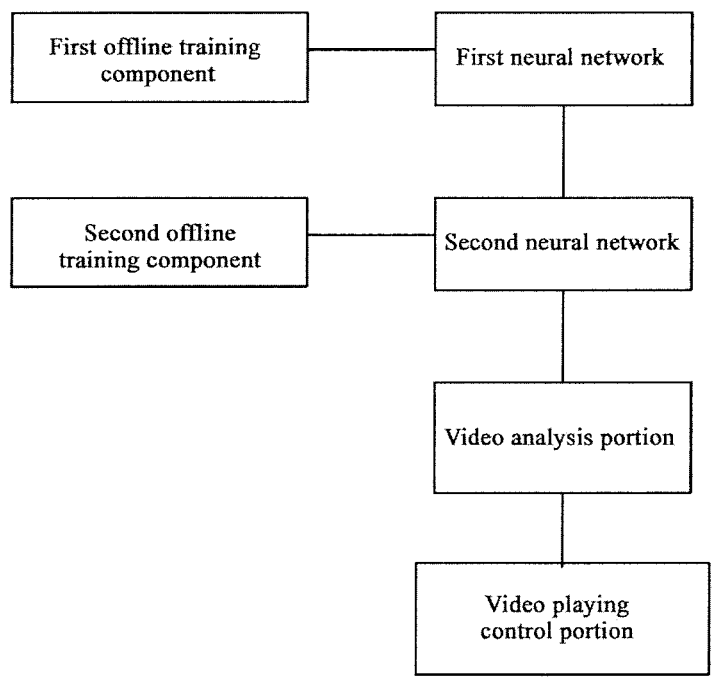
FIG. 7 shows a schematic diagram of a video playing system according to an embodiment of the present disclosure.

As shown in FIG. 7, the present disclosure provides a video playing system that includes both the video playing device in the above embodiment and a first offline training component and a second offline training component. The first offline training component is configured to, in an offline state, generate a first neural network by training with physical parameters of a user and human universal emotion categories. The second offline training component is configured to, in the offline state, generate a second neural network by training with video content samples and emotion category samples of the user output from the first neural network.

In the video playing system in the present disclosure, the first neural network is generated by using the first offline training component, the second neural network is generated by using the second offline training component, the first and second neural networks are applied to the video playing device, and the contents of the video to be played are selectively played. For example, a video segment is played only in the case that the user's emotion category corresponding to the video segment is "like". Therefore, the purpose of improving user experience can be achieved.

The present disclosure provides an apparatus comprising at least one processor and a memory for storing at least one program. The at least one program, when executed by the at least one processor, performs the aforementioned video playing method.

Figure 8:
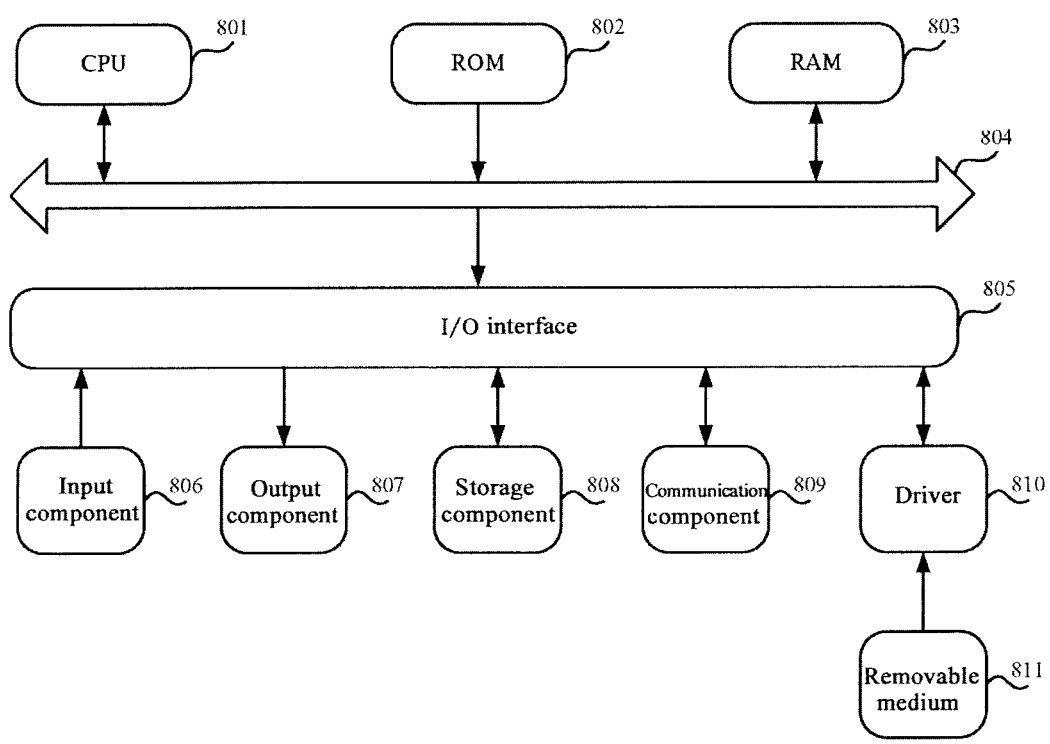
FIG. 8 shows a schematic diagram of a structure of an apparatus according to an embodiment of the present disclosure.

FIG. 8 shows a schematic structural diagram of an apparatus according to an embodiment of the present disclosure.

As shown in FIG. 8, the present disclosure further provides an apparatus including at least one central processing component (CPU) 801 that may perform various appropriate actions and processes according to programs stored in a read only memory (ROM) 802 or loaded to a random access memory (RAM) 803 from a storage component 808. In the RAM 803, various programs and data required for an operation of the apparatus shown in FIG. 8 are also stored. CPU 801, ROM 802, and RAM 803 are connected to each other through a bus 804. An input/output (I/O) interface 805 is also connected to the bus 804.

The apparatus further includes following components connected to the I/O interface 805: an input component 806 including a keyboard, a mouse, and the like; an output component 807 including a cathode ray tube (CRT), a liquid crystal display (LCD), a speaker, and the like; and the like; an storage component 808 including a hard disk and the like; and a communication component 809 including a network interface card such as a LAN card, a modem, and the like. The communication component 809 performs communication processing via a network such as the Internet. A driver 810 is also connected to the I/O interface 805 as needed. A removable medium 811 such as a magnetic disk, an optical disk, a magneto-optical disk, a semiconductor memory, and the like is mounted on the drive 810 as needed so that computer programs read therefrom can be installed into the storage component 808 as needed.

The present disclosure provides a computer-readable storage medium storing computer programs, wherein the aforementioned video playing method is implemented when the computer programs are executed by a processor.

Flowcharts and block diagrams in the figures illustrate architectures, functionalities, and operations of systems, methods, and computer program products according to various embodiments of the present disclosure which can be implemented. In this regard, each block of the flowcharts or block diagrams may represent a portion, a program segment, or a part of code, and the portion, the program segment, or the part of the code includes at least one executable instruction for implementing a specified logic function. It should also be noted that in some alternative implementations, the functions in the blocks may be implemented in a different order relative to those in the figures. For example, two blocks represented as a sequential connection may in fact be implemented substantially in parallel, and may sometimes be implemented in a reverse order according to functions involved. It should also be noted that each block of the block diagrams and/or flowcharts, and combinations of the blocks can be implemented by a special purpose hardware-based system that performs specified functions or operations, or can be implemented by a combination of a special purpose hardware and computer instructions.

Components or portions involved in the embodiments of the present disclosure may be implemented through software or hardware. The described components or portions may also be provided in a processor. For example, each of the components or portions may be a software program installed in a computer or a mobile smart device, or may be a separately configured hardware device. In some cases, these components or portions are not limited by their title.

It will be appreciated that above implementations are only exemplary implementations for illustrating the principle of the disclosure, and the present disclosure is not limited thereto. An ordinary person skilled in the art may make various modifications and improvements without departing from the spirit and essence of the present disclosure. These modifications and improvements should be considered as the protective scope of the present disclosure.

What is claimed is:

1. A video playing method, comprising:
dividing a video to be played into a plurality of video segments and labelling, respectively, the plurality of video segments with emotion categories of a user as labels according to a pre-stored correspondence between the emotion categories of the user and video contents, and determining whether each video segment of the plurality of video segments is to be played according to the label of the video segment, wherein the emotion categories of the user are determined based on a pre-generated first neural network, and the first neural network is configured to determine the emotion categories of the user based on physical parameters of the user, and wherein the correspondence between the emotion categories of the user and the video contents comprises a second neural network, and the second neural network is generated by training with samples of the video contents and samples of the emotion categories of the user output from the first neural network.

2. The video playing method according to claim 1, wherein the physical parameters of the user comprise facial expression and physiological parameters of the user.

3. The video playing method according to claim 2, wherein the physiological parameters comprise at least one of heart rate, blood pressure, and blood oxygen.

4. The video playing method according to claim 1, wherein the video content comprises one frame of image or a video segment comprising a plurality of frames of image.

5. The video playing method according to claim 4, wherein the video content comprises one frame of image, and the step of dividing a video to be played into a plurality of video segments and labelling, respectively, the plurality of video segments with emotion categories of a user as labels according to a pre-stored correspondence between the emotion categories of the user and video contents, comprises:
according to the pre-stored correspondence between the emotion categories of the user and the video contents, acquiring a plurality of frames of image in the video to be played;
as for each frame of image of the acquired plurality of frames of image, causing the frame of image together with a predetermined number of frames of image immediately before and after the frame of image to be divided into a same video segment; acquiring an emotion category of the user corresponding to the frame of image, and labelling the video segment to which the frame of image belongs with the emotion category of the user as a label,
wherein the video segments have different durations, and there is no overlap between every two video segments.

6. A video playing device, comprising:
a video analysis portion configured to divide a video to be played into a plurality of video segments and label, respectively, the plurality of video segments with emotion categories of a user as labels to the plurality of video segments according to a pre-stored correspondence between the emotion categories of the user and video contents; and
a video playing control portion configured to determine whether each video segment of the plurality of video segments is to be played according to the label of the video segment,
the video playing device further comprises a physical parameter acquisition portion and a first neural network generation and application portion, wherein
the physical parameter acquisition portion is configured to acquire physical parameters of the user, and the first neural network generation and application portion is configured to generate a first neural network for representing a correspondence between physical parameters of the user and emotion categories of the user by using the acquired physical parameters of the user, and determine emotion categories of the user by using the generated first neural network, the correspondence between the emotion categories of the user and the video contents comprises a second neural network, and the second neural network is generated by training with samples of the video contents and samples of the emotion categories of the user output from the first neural network.

7. The video playing device according to claim 6, wherein the physical parameter acquisition portion comprises:
   a face acquisition component configured to acquire facial expression of the user, and
   a physiological parameter acquisition component configured to acquire physiological parameters of the user.

8. The video playing device according to claim 7, wherein the physiological parameter acquisition component comprises a smart wristband.

9. The video playing device according to claim 7, wherein the physiological parameters comprise at least one of heart rate, blood pressure, and blood oxygen.

10. The video playing device according to claim 6, wherein the video content is one frame of image or a video segment comprising a plurality of frames of image.

11. The video playing device according to claim 10, wherein the video content comprises one frame of image,
   the video analysis portion is configured to, according to the pre-stored correspondence between the emotion categories of the user and the video contents, acquire a plurality of frames of image in the video to be played, and
   the video analysis portion is further configured to, as for each frame of image of the acquired plurality of frames of image, cause the frame of image together with a predetermined number of frames of image immediately before and after the frame of image to be divided into a same video segment, acquire an emotion category of the user corresponding to the frame of image, and label the video segment to which the frame of image belongs with the emotion category of the user as a label, and
   the video segments have different durations, and there is no overlap between every two video segments.

12. A video playing system comprising the video playing device of claim 6.

13. The video playing system according to claim 12, wherein the video playing device comprises the first neural network for representing the correspondence between physical parameters of the user and emotion categories of the user; and the video playing system further comprises a first offline training component configured to, in an offline state, generate the first neural network by using the physical parameters of the user.

14. The video playing system according to claim 13, wherein the correspondence between the emotion categories of the user and the video contents comprises a second neural network; and the video playing system further comprises a second offline training component configured to, in the offline state, generate a second neural network by training with samples of the video contents and samples of the emotion categories of the user output from the first neural network.

15. An apparatus, comprising:
   at least one processor, and
   a memory for storing at least one program,
   wherein the at least one program, when executed by the at least one processor, performs the video playing method of claim 1.

16. A non-transitory computer-readable storage medium storing instructions which, when executed by a processor, cause the processor to perform a method comprising:
   dividing a video to be played into a plurality of video segments and labelling, respectively, the plurality of video segments with emotion categories of a user as labels according to a pre-stored correspondence between the emotion categories of the user and video contents, and
   determining whether each video segment of the plurality of video segments is to be played according to the label of the video segment,
   wherein the emotion categories of the user are determined based on a pre-generated first neural network, and
   the first neural network is configured to determine the emotion categories of the user based on physical parameters of the user, and
   wherein the correspondence between the emotion categories of the user and the video contents comprises a second neural network, and
   the second neural network is generated by training with samples of the video contents and samples of the emotion categories of the user output from the first neural network.

* * * * *